April 1, 1924.

W. B. KOUWENHOVEN 1,488,603

DEVICE FOR DISPENSING FLUID MATERIAL OR THE LIKE

Filed Aug. 19, 1920   2 Sheets-Sheet 1

Inventor

William B. Kouwenhoven

By Henry E. Rockwell

Attorney

April 1, 1924.

W. B. KOUWENHOVEN 1,488,603

DEVICE FOR DISPENSING FLUID MATERIAL OR THE LIKE

Filed Aug. 19, 1920　　2 Sheets-Sheet 2

Patented Apr. 1, 1924.

1,488,603

UNITED STATES PATENT OFFICE.

WILLIAM B. KOUWENHOVEN, OF BALTIMORE, MARYLAND, ASSIGNOR TO WINCHESTER REPEATING ARMS COMPANY, OF NEW HAVEN, CONNECTICUT.

DEVICE FOR DISPENSING FLUID MATERIAL OR THE LIKE.

Application filed August 19, 1920. Serial No. 404,513.

*To all whom it may concern:*

Be it known that I, WILLIAM B. KOUWENHOVEN, a citizen of the United States, resident of the city of Baltimore, State of Maryland, have invented certain new and useful Improvements in Devices for Dispensing Fluid Material or the like, of which the following is a full, clear, and exact description.

This invention relates to dispensing or filling devices, and more particularly to a device capable of discharging a predetermined amount of a freely flowing liquid material into a plurality of containers simultaneously. While such a device is capable of use in several different arts and processes and may be employed in connection with the handling of many materials, I have found it especially desirable in connection with the charging of the cups of dry cells with the required amount of electrolytic paste. In the manufacture of some dry cells, the paste which usually serves as a carrier for the electrolyte is very liquid or fluent at low temperatures and becomes a gelatinous or stiff mass upon its being warmed to room temperature. For this reason such material may be kept cold and poured in the cups as a liquid, becoming semi-solid when the temperature rises after the cell is assembled. It will be apparent that when it is necessary to keep this electrolytic liquid cool that it is particularly desirable to be able to charge a plurality of cups at one time and to handle the mixture with all dispatch possible, so that it will not become too stiff to flow comparatively freely. It is also necessary that the paste be measured so that a certain fixed amount will be dispensed into each one of the cups.

One object of my invention is to provide a dispensing device which will result in the saving of much labor in filling cups or containers with material of this nature.

A further object of my invention is to provide a device of the character described by which the material to be dispensed is handled expeditiously, without loss of the same and with neatness.

A further object of my invention is to provide a device which will fill a plurality of containers simultaneously.

A still further object of my invention is to provide a dispensing device which will discharge a certain predetermined amount of the material to be dispensed into each container.

With these and other objects in view, the invention consists in the novel features and combinations of parts to be hereinafter described and claimed.

While I have chosen to show and describe a preferred form of my invention as applied to a device for charging dry cell cups, it is to be understood that the invention is not so limited, but may be used in other relations and with other materials without departing from the spirit of the invention or the claims to be made.

Figure 1:
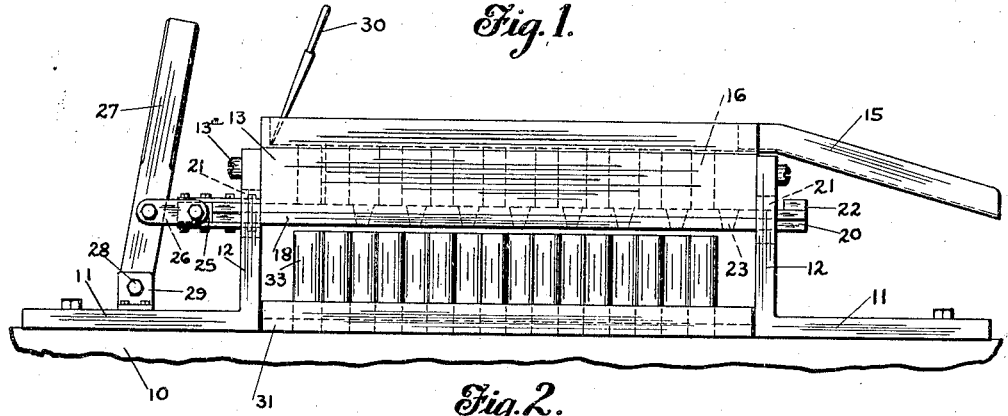
Fig. 1 is a side elevational view of a dispensing device embodying my invention.
Figure 2:
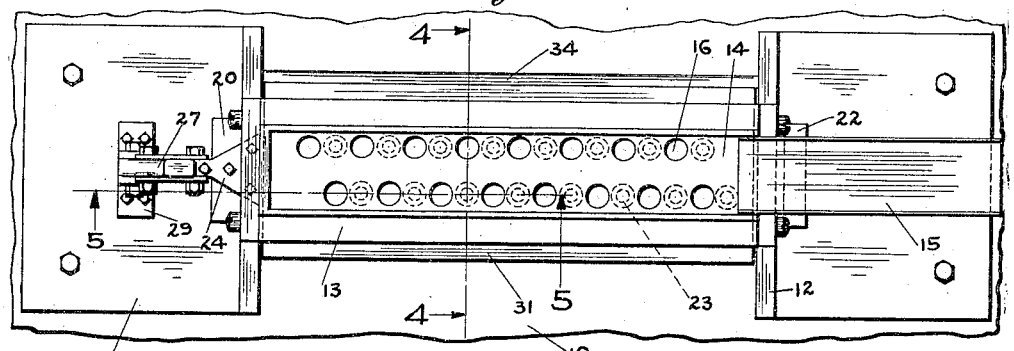
Fig. 2 is a plan view of the same.
Figure 4:
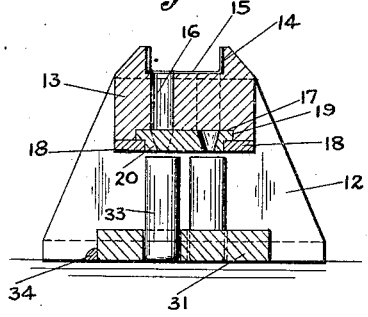
Fig. 4 is a sectional view on line 4—4 of Fig. 2.

I have shown at 10 a support which may be in the form of a table of any suitable nature, which will be provided with a flat surface to serve as a base for the parts of the mechanism to be described. Supported on this table are two standards which consist of base portions 11 and upright portions 12. A table or slab 13 is supported between the upright portions of the standards, being suitably secured to the upper ends of the same by bolts or suitable fastening members 13ª. On the upper surface of this table there is provided a trough 14, which preferably may be formed when the table is cast. This trough is arranged longitudinally of the table 13 and as shown in Fig. 4 is channel-shaped in cross-section, the sides of the slab rising above the base of the trough. The trough is closed at one end, the left end, as shown in Figs. 1 and 2 of the drawings, and at its other end it is left open for the reception of a spout 15 or the like, which will be channel-shaped in cross-section and will fit within the sides of the trough to carry off the surplus material, as will be described hereinafter.

The table or slab 13 is provided with a plurality of bores 16, which, as shown, extend entirely through this slab. These bores are provided within the sides of the trough 14. It will be understood that in some aspects of the invention, these bores may not extend entirely through the slab, but will simply be provided with an opening at their lower ends. At the lower side of the slab, there is provided a second channel-shaped groove or cut-out portion 17 and a guide member 18 is secured on each side of this groove, the edges of these guide members projecting over the sides of this groove portion and providing guide-ways 19 for a slide 20, which is operatively mounted within the guide-ways. This slide 20 is arranged to project through openings 21 in the members 12. A stop 22 is provided on one end of this slide and is arranged to abut the slab 13 when the slide is drawn to one of its extreme positions. As shown in the drawings, this stop member would abut the slab when the slide is drawn to the left.

Figure 5:
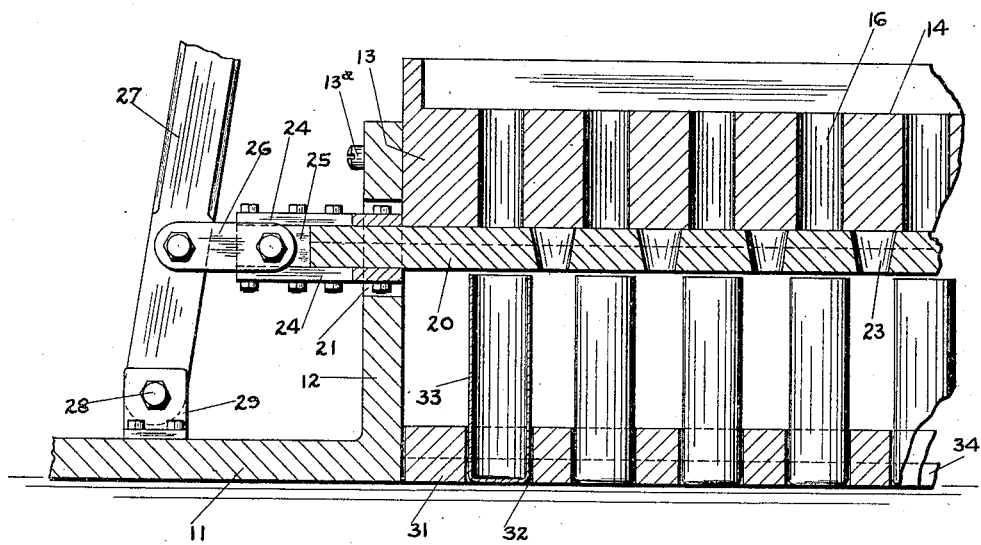
Fig. 5 is a sectional view on line 5—5 of Fig. 2.
Figure 6:
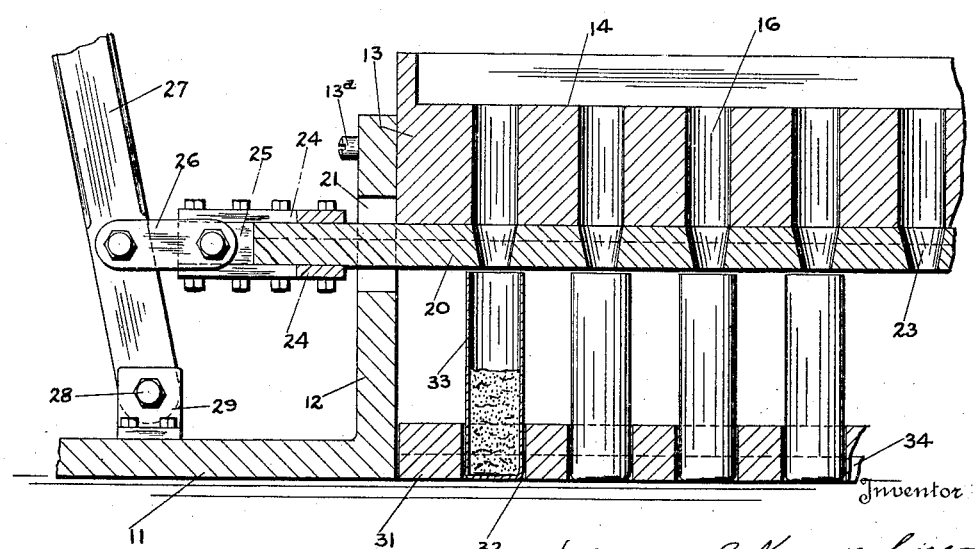
Fig. 6 is a sectional view similar to Fig. 5, but showing the slide in another position.

The slide is provided on the portion which lies between the two standards 12 with a plurality of funnel-shaped openings 23. These openings correspond in position and in number with the bores 16 and are adapted to register therewith when the slide is in one of its extreme positions, as shown in Fig. 6 of the drawings. It is apparent that the slide 20 will, therefore, consist of solid portions, which will form closure members for the lower ends of the bores 16, and when these bores are filled with the material, which is to be dispensed, it will be retained therein by the solid portions of the slide, the bores acting as containers for the material, as shown in Fig. 5 of the drawings. When the slide is moved to the left, as shown in Fig. 6, the closure members or the solid portions of the slide will be withdrawn from below the bores 16 and the funnel-shaped openings 23 will be brought into register with the bores 16, and the material which is contained within these bores will flow down through them into the containers below which will be described hereafter.

It will be apparent that in some aspects of the invention the closure members and the funnels may not be provided, as shown, in one integral slide member, but these may consist of separate closure and funnel members, which are connected together for simultaneous movement.

Figure 3:
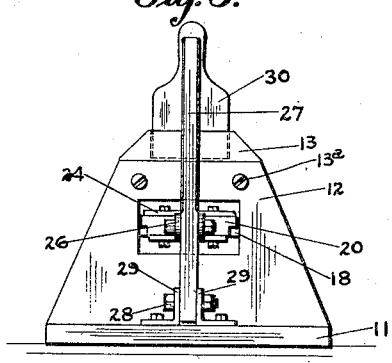
Fig. 3 is an end elevation of the device.

At the left end, as shown in the drawings, the slide 20 is provided with two strap members or plates 24, between which is secured a spacing block 25 and to this spacing block is pivoted a pair of links 26, which at their other ends are pivoted to a lever 27, which is in turn pivoted at 28 to a bracket 29 on one of the supports 12. A scraper member or paddle 30 is shown in Figs. 1 and 3 of the drawings, which is adapted to be drawn along with its lower edge in contact with the bottom of the trough 14 and thus expel any surplus material which may lie in this trough down into the spout 15 and thence away from the machine. The spout 15 may deliver this surplus material into any suitable receptacle which is placed beneath it. This movement of the paddle along the upper surface of the slab 13 insures that the bores 16 will all be filled to the level of the surface of the slab. If these bores are of the proper size to hold just the quantity of material which is desired to be discharged into the containers, it will be apparent that this will provide a convenient and satisfactory way to measure the material discharged into the containers, so that the proper amount will be discharged therein.

A tray 31 is provided which is preferably of size to contain a plurality of openings 32, which will correspond in number and position with the bores 16 in the slab 13. This tray may be in the form of a flat rectangular piece of wood or the like, with the bores 32 extending through the same. The containers or cups to be filled are placed in the openings 32 and rest upon the table or support 10. It will be apparent that this tray may be placed upon the table, the containers 33 may be put in the openings 32, and the tray then moved along the surface of the table until the containers will lie directly beneath the bores 16. This may be conveniently provided for by having the tray 31 just the proper length to fit within the bracket members 12, and thus position the tray longitudinally of the slab 13, while a stop rail 34 is provided at the back of the machine to limit the movement of the tray transversely of the slab.

The operation of the device is as follows: The slide is first moved to the right, as shown in Figs. 1 and 5. The plates 24 serve to limit this movement to the right by striking against the slab 13, as shown in Fig. 5. The material to be dispensed is poured upon the slab 13 within the trough 14. This is usually in fluid form and hence will spread out over the trough filling the bores 16. The paddle or scraper member 30 is then drawn along by the operator with its lower edge in contact with the bottom of the trough, thus filling all the bores 16 full to the level of the surface of the slab and expelling the surplus material through the spout 15.

The tray 31 filled with the containers or cups 33 is now moved underneath the slab 13. The slide is then drawn to the left by the lever 27, as far as the stop 22 will allow it to go. This movement to the left will just bring the funnel-shaped openings 23 into register with the bores 16 and thus will allow the material which is contained in the bores 16 to drop into the containers 33. The slide is then moved back to the right and the operation is repeated with a new set of containers.

It is seen that this will provide a very expeditious and efficient way to charge or fill a plurality of containers with a given quantity of any material simultaneously. The material will be handled with neatness, it will require a minimum of handling by the operator and a satisfactory method will be provided to measure the amount of material which will be discharged into each of the containers. While I have shown and described my invention as applied to a device for filling the cups for dry cells wherein a liquid material is used, it will be apparent that it is capable of use with a powder or with a substance in granular form, or which may be in fine particles or in fact with any substance which will be sufficiently fluent to be discharged by gravity through the openings 23 in the slide.

It will be understood that I do not intend to be limited to the exact details of the preferred embodiment shown in the drawings, for the invention is capable of expression in various forms and modifications, which will lie within the scope of the appended claims.

What I claim is:

1. A dispensing device comprising a pair of L shaped supporting standards, each having a base portion designed to be secured to a table or the like, and an upright portion rising vertically from the base portion, a slab secured to and between the upright portions of the standard at the upper ends thereof whereby it is spaced from the table, said slab having a channel shaped depression in its upper face constituting a trough, and being provided with a plurality of bores in the bottom of said depression extending through the lower face thereof, said slab being provided with a groove in its lower face, a slide reciprocably mounted in said groove, guide plates secured to the under face of the slab and overlapping the edges of the slide to hold it in position, said slide being provided with perforations adapted to be brought in to register with the bores of the slab, the ends of said slide projecting through openings in the standards, stop means on the projecting ends of the slide, and means to operate the slide.

2. A dispensing device comprising a pair of L shaped supporting standards, each having a base portion designed to be secured to a table or the like, and an upright portion rising vertically from the base portion, a slab secured to and between the upright portions of the standard at the upper ends thereof whereby it is spaced from the table, said slab having a channel shaped depression in its upper face constituting a trough, and being provided with a plurality of bores in the bottom of said depression extending through the lower face thereof, said slab being provided with a groove in its lower face, a slide reciprocably mounted in said grooves, guide plates secured to the under face of the slab and overlapping the edges of the slide to hold it in position, said slide being provided with perforations adapted to be brought in to register with the bores of the slab, the ends of said slide projecting through openings in the standards, stop means on the projecting ends of the slide, and means to operate the slide, said means comprising a lever fulcrumed upon the base portion of one of the standards and connected to the slide.

In witness whereof, I have hereunto set my hand on the 16th day of August, 1920.

WILLIAM B. KOUWENHOVEN.